(12) United States Patent
Dawley et al.

(10) Patent No.: US 10,530,019 B2
(45) Date of Patent: Jan. 7, 2020

(54) BATTERY MODULE WITH RESISTANCE-WELDED SENSELINE TABS AND METHOD OF MANUFACTURING THE SAME

(71) Applicant: GM GLOBAL TECHNOLOGY OPERATIONS LLC, Detroit, MI (US)

(72) Inventors: Evan J. Dawley, Lake Orion, MI (US); Wayne W. Cai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 407 days.

(21) Appl. No.: 15/341,392

(22) Filed: Nov. 2, 2016

(65) Prior Publication Data

US 2018/0123188 A1    May 3, 2018

(51) Int. Cl.
*H01M 10/48* (2006.01)
*H01M 2/20* (2006.01)

(52) U.S. Cl.
CPC .......... *H01M 10/48* (2013.01); *H01M 2/202* (2013.01)

(58) Field of Classification Search
CPC ......... H01M 10/48; H01M 2/02; H01M 2/202
See application file for complete search history.

(56) References Cited

U.S. PATENT DOCUMENTS

2015/0295280 A1* 10/2015 Cho .................... H01M 10/425
429/158

FOREIGN PATENT DOCUMENTS

JP         2014-127418    *  7/2014  ............. H01M 2/10

* cited by examiner

*Primary Examiner* — Osei K Amponsah
(74) *Attorney, Agent, or Firm* — Quinn IP Law

(57) ABSTRACT

A battery module includes a battery cell, a bus bar, and a multilayered cell sense flex circuit having a senseline tab containing a portion of a senseline. The flex circuit determines a battery cell voltage. The bus bar has surface projections, possibly with a variable height and/or width, such that the bus bar penetrates into the tab at least as far as the senseline. Adhesive material may be used on the welded joint. A method of manufacturing the battery module includes forming, in the bus bar, one or more surface projections, e.g., multiple projections having the variable height and/or width, positioning a senseline tab of the flex circuit adjacent to such projections, and joining the tab to the surface projections such that the projections penetrate at least partially into the flex circuit at least as far as the senseline.

20 Claims, 5 Drawing Sheets

BATTERY MODULE WITH RESISTANCE-WELDED SENSELINE TABS AND METHOD OF MANUFACTURING THE SAME

INTRODUCTION

Electrochemical battery packs are used to energize electric machines in a variety of systems. For instance, output torque from a rotor shaft of a traction motor or a motor/generator unit may be transmitted to a rotatable member, e.g., a shaft or gear element of a planetary transmission. The electric machine draws electrical power from or delivers electrical power to individual battery cells of the battery pack as needed. In turn, the battery pack may be recharged via a charging current supplied from an offboard power supply or using onboard power generation. The charging and discharging currents, as well as the individual cell voltages, are closely monitored and regulated by a battery controller to optimize overall battery pack and system performance.

A battery pack may be constructed of multiple similarly-constructed battery modules. In some configurations, operation of the various battery modules may be regulated by a resident master controller commonly referred to as a battery management system (BMS). Each battery module may include a voltage sensing circuit constructed of flexible circuit board material having integrated voltage senselines. The senselines of the flex circuit are configured to measure and report the individual cell voltages to the BMS as part of an overall battery control strategy.

SUMMARY

A battery module of the type described herein has multiple battery cells, conductive bus bars, and a multi-layered cell sense flex circuit with multiple senseline tabs each containing a portion of a senseline for a corresponding battery cell. Also described is a method for joining the senseline tabs to the bus bars using a projection resistance welding process. The method in its various embodiments may be used to form welded joints or weld spots between the tabs of the flex circuit and the individual bus bars.

An example embodiment of the battery module includes a battery cell, a bus bar joined to the battery cells and having at least one surface projection, and a cell sense flex circuit. The flex circuit, which is configured to measure or otherwise determine a cell voltage of the battery cell, has a conductive senseline positioned between a pair of substrates, and also has a senseline tab that is internally coupled to the senseline. The bus bar has at least one projection and is projection resistance welded to the senseline tab such that the at least one projection penetrates into the senseline tab at least as far as the senseline contained therein.

Geometric variation in the projections may provide a contact area between the senseline tab and bus bar, e.g., with a variable height and/or width, and thus with different possible weld qualities. The bus bar may be projection resistance-welded to the tab such that the projections penetrate into the tab to different relative depths, each penetrating at least as far as the senseline, so as to make good electrical contact with the senseline within the tab. Depending on the embodiment, some projections may penetrate more deeply into the tab than other projections, possibly including some projections that fully penetrate all the way through the tab. When multiple surface projections are used, the spatial orientations of the various surface projections may be optionally varied between adjacent bus bars, e.g., rotated 180 degrees, and/or the height of some of the projections may vary between the adjacent bus bars, i.e., an identity of a longest projection of the plurality of projections is different between the adjacent pair.

Adhesive material may be applied to a welded joint or weld spot formed by joining the senseline tab to the surface projections of the bus bar, particularly when the surface projection(s) fully penetrate the senseline tab to expose some of the material of the bus bar. The adhesive material, e.g., a spray-type or a hot melt-type of adhesive, may be deposited or applied between the bus bar and senseline tab and/or atop a surface of the flex circuit/senseline tab in different embodiments, including coating any exposed portions of the bus bar that fully penetrate the senseline tab.

The bus bar may be optionally embodied as an elongated channel of a generally U-shaped cross-section, for instance with each bus bar having an elongated floor flanked by a pair of orthogonally-arranged side walls. The variable geometry of the cell sense flex circuit may be formed as surface projections of the floor of the bus bar extending toward the tab, i.e., orthogonally outward/away from a lengthwise axis of such a floor.

In some embodiments, the senseline tab may define a center hole. The adhesive material may cover the center hole and an exposed portion of the bus bar adjacent to the center hole.

The senseline tab may optionally define a pair of side notches adjacent to the center hole, in which case the adhesive material may cover an area of the center hole and the side notches.

The bus bars may define a coined or dimpled pattern providing the projections, with such a coined or dimpled pattern configured to limit an area of contact between the bus bars and the cell sense flex circuit.

A method is also disclosed herein for manufacturing such a battery module. The method may include forming a set of surface projections in the bus bar, and then positioning a respective senseline tab of the flex circuit adjacent to the bus bar projections. Additionally, the method may include joining the senseline tab to the bus bar via a projection resistance welding process such that the surface projections penetrate into the tab at least as far as the conductive senseline contained therein.

An adjacent pair of the bus bars may have parallel longitudinal axes, i.e., a longitudinal axis of one bus bar is parallel to a longitudinal axis of an adjacent bus bar. The method in such an example may include changing a pattern of distribution of the projections of the adjacent pair, such as by rotating the pattern 180 degrees between the adjacent pair. Alternatively, the projection or projections having a longer length may vary between adjacent bus bars. In this manner, the identity or location of the longest of the projections within a given pattern of projections may differ between the adjacent pair.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

DETAILED DESCRIPTION

Figures 1, 1A:
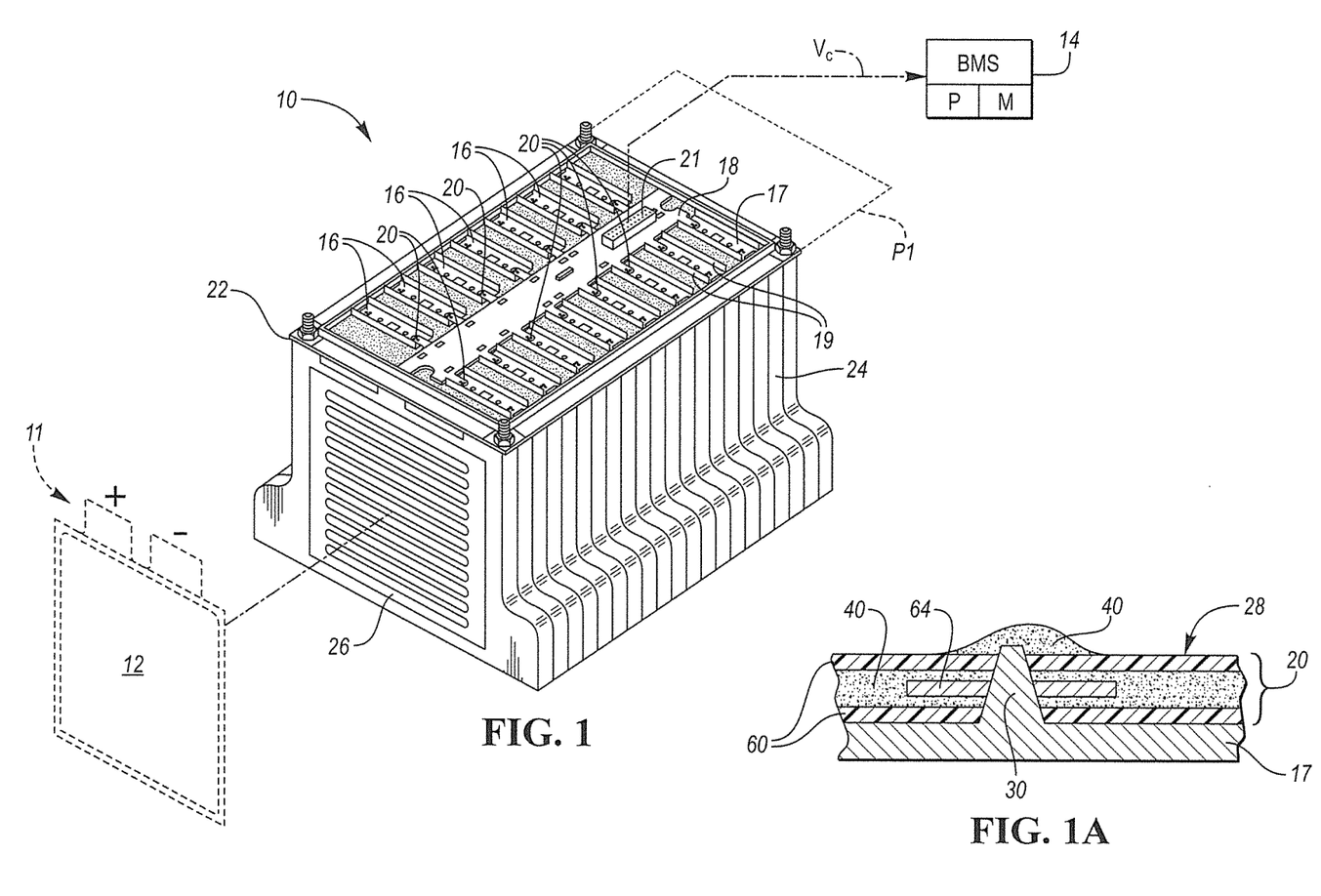
FIG. 1 is a schematic perspective view illustration of an example battery module having conductive bus bars and a cell sense flex circuit that is projection resistance-welded to the bus bars in the manner set forth herein.
FIG. 1A is a schematic partial cross-sectional view of a senseline tab of the cell sense flex circuit and surface projections of the bus bar.

Referring to the drawings, wherein like reference numerals are used to identify like or identical components in the various views, FIG. 1 schematically illustrates an example battery module 10. The battery module 10 contains a plurality of battery cells 12, e.g., a polymer-coated metal foil pouch-type battery cell of the type shown in FIG. 1. Each battery cell 12 has positive (+) and negative (−) electrode extensions 11 embodied as tabular extensions of the battery cell 12. A predetermined number of the battery cells 12 are arranged adjacent to each other within an outer cage 24 and secured via a pair of end plates 26 such that the electrode extensions 11 of the various battery cells 12 are serially arranged or otherwise oriented in a desired orientation.

The battery module 10 may be embodied as part of a rechargeable energy storage system with multiple similarly-constructed battery modules 10 arranged to form a larger battery pack (not shown). The battery module 10 may be a relatively high-voltage energy storage device with a number of battery modules 10 and battery cells 12 that is dependent on the amount of required electrical power. For instance, 192 or more individual lithium-ion battery cells 12 may be used in an example embodiment, with the battery cells 12 being collectively capable of outputting at least 18-60 kWh of energy depending on the configuration. Such a battery module 10 may be used to supply power in a vehicle, a powerplant, or other electricity producing or consuming system.

A Battery Management System (BMS) 14 may be used as an electronic controller in conjunction with the battery module 10. The BMS 14 may include one or more computer devices each having a processor (P) and sufficient amounts of memory (M), e.g., read only memory, random access memory, and electrically-erasable programmable read only memory. The BMS 14 may be connected to a multi-layered cell sense flex circuit 18, an example of which is described below with reference to FIG. 1A, e.g., via a multi-pin connector 21 and/or a wireless connection. The BMS 14 is programmed or otherwise configured to receive cell voltage signals (arrow $V_C$) from the cell sense flex circuit 18. Although omitted from FIG. 1 for illustrative clarity, such cell voltage signals (arrow $V_C$) are transmitted within the flex circuit 18 along a corresponding conductive trace or voltage senseline 64 (see FIG. 1A) leading, via connection to a given bus bar 16, to a corresponding battery cell 12. The BMS 14 may also be configured to run/execute various software programs in the overall control of the battery module 10 so as to execute a control action with respect to the battery module 10 using such measured cell voltages (arrow $V_C$). An example control action may include controlling the overall operation of the battery module 10, for instance in the process of cell voltage or charge balancing, power flow control, and/or thermal regulation.

The battery module 10 of FIG. 1 includes a plurality of bus bars 16 optionally arranged in parallel rows as shown and collectively providing an electrical connection between the electrode extensions 11 of the battery cells 12. The bus bars 16 may be configured, in an example embodiment, as elongated U-shaped channels each having a floor 17 flanked by and joining a pair of side walls 19. The side walls 19 in such an embodiment may be orthogonally arranged with respect to the floor 17. The bus bars 16 may be constructed of copper or another suitable electrically conductive material. The electrode extensions 11 of the individual battery cells 12 may be arranged to protrude from inside of the battery module 10 through a top plate 22 and ultrasonically welded to the side walls 19 of a corresponding bus bar 16.

The cell sense flex circuit 18 noted above has a plurality of generally flat senseline tabs 20 that are in direct physical and electrical contact with a respective one of the bus bars 16, e.g., with the floor 17 as shown. The flex circuit 18 may be embodied as a relatively thin flexible piece of multi-layered printed circuit board material having a plurality of the tabs 20 oriented parallel to a plane (P1) of the flex circuit 18. The tabs 20 may be embodied as alternating semicircular, triangular, or rectangular circuit board material. Each tab 20 may be projection resistance-welded as set forth herein to the bus bars 16 to provide a direct electrical connection between the bus bars 16 and the senselines 64 of the flex circuit 18, with such an electrical connection being sufficient for measuring a respective one of the cell voltages ($V_C$) of the battery cells 12.

Referring briefly to FIG. 1A, each senseline tab 20, as with the rest of the flex circuit 18 of FIG. 1, may be embodied as a thin multi-layer stack up of different circuit board materials. In an example embodiment, a senseline tab 20 may include a pair of substrate layers 60, adhesive material 40, and a plurality of the senselines 64, only one of which is shown in FIG. 1A for simplicity. The substrate layers 60, which together enclose and protect the individual senselines 64, may be constructed of a suitable dielectric polymer material, e.g., polyimide or polyethylene napthalate (PEN). Although not shown in FIG. 1A for illustrative simplicity, in order to weld, the material of the substrate layers 60 and adhesive may be locally removed, either by stamping or laser process, so that both sides of the senselines 64 are exposed for the welding process.

The thickness of the tab 20 depends on the manufacturer and material specification. As a non-limiting example embodiment, for instance, the substrate layers 64 may each be about 50 microns thick, the adhesive material 40 within the tab 20 may be about 25-50 microns thick, and the senseline 64 may be about 18-70 microns thick. The senselines 64 form the conductive traces within the flex circuit 18, along with the bus bar 16 (a floor 17 of which is shown in FIG. 1A), and may be constructed of a thin layer of copper or another suitable electrical conductor. A surface 28 of the tab 20 that is not adjacent to the floor 17 may be penetrated in some embodiments by one or more surface projections 30 of the floor 17, with any penetrating portions of the surface projection 30 adjacent to the surface 28 thereafter coated with adhesive material 40 as explained below with reference to FIGS. 2C, 3C, 4C, and 6C.

As will be explained in further detail below with reference to the remaining Figures, the bus bars 16 may be provided with a variable geometry, e.g., in the form of a variable height and/or a variable width with respect to a respective height and width of the flex circuit 18, or other suitable variable geometry, such that material of one or more of the bus bars 16 penetrates into the flex circuit 18 at least as far as the portions of the senselines 64 located inside of the tabs 20. The variable geometry of the flex circuit 18 may be formed as part of the floor 17 of the bus bars 16, for example as surface projections thereof. Use of such variable geometry is intended to provide areas of different penetration depths, and thus different contact areas, in any formed weld spots or joints. However, the surface projections 30 may be of the same height and width in other embodiments.

Figures 2A, 2B, 3A, 3B:
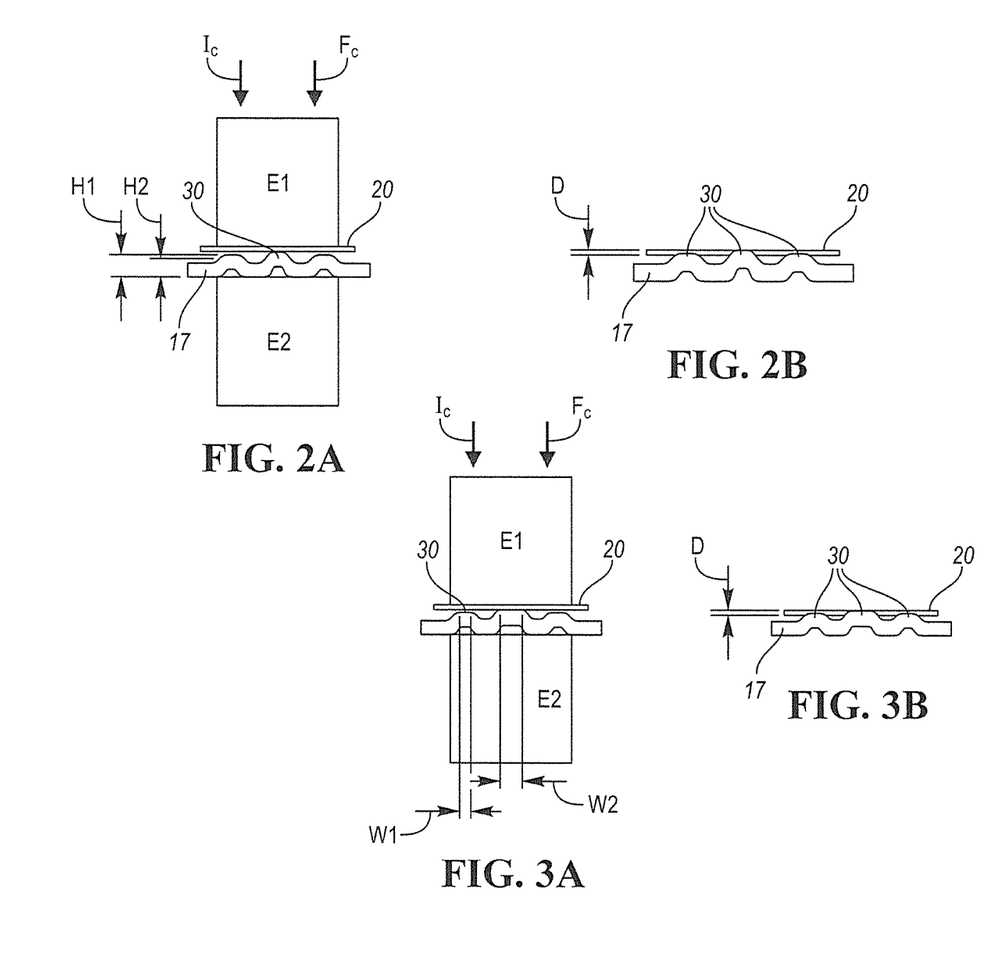
FIGS. 2A-2C are schematic side view illustrations depicting a process of joining a bus bar and a senseline tab, with the bus bar having an example variable height.
FIGS. 3A-C are schematic side view illustrations depicting a process of joining the bus bar and senseline tab, with the bus bar having an example variable width.

FIGS. 2A-6C collectively illustrate possible embodiments of a method for manufacturing the battery module 10 of FIG. 1. In an example approach, the method includes forming the surface projections 30 on the floor 17 of the bus bar 16 (see FIG. 1), i.e., protrusions, surface bosses, or other features extending outward from the floor 17 and toward the tab 20. For instance, the floor 17 may be cast or formed in a mold with such projections 30. The surface projections 30 may include a variable height and/or width, with the method including positioning a tab 20 of the cell sense flex circuit 18 of FIG. 1 adjacent to such surface projections 30 and projection resistance welding the tab 20 to the projections 30. The surface projections 30 of the bus bar 16 penetrate at least partially into the flex circuit 18 at least as far as the senselines 64 (see FIG. 1A). This ensures good electrical contact between the bus bars 16 and a corresponding senseline 64. FIGS. 2A, 2B, and 2C in particular schematically depict an optional embodiment of such a method. In this example embodiment, the variable geometry of the bus bar 16 is that of a variable height of a plurality of the surface projections 30 of the floor 17. At least one of the surface projections 30 may have a height H1 that is greater than a height H2 of one or more of the remaining projections, e.g., by about 5 to 10 micron. The variation in height between different surface projections 30, or between a surface projection 30 and the rest of the floor 17 when only one surface projection 30 is used, is intended to provide welds of different contract areas, and thus of possibly different weld quality. Similarly, joining a senseline tab 20 to the bus bar 16 using surface projections 30 of greater height may ensure that some or all of the projections 30 having the greater height penetrate fully through the senseline tab 20.

FIG. 2A depicts a projection resistance welding process in which a pair of electrodes E1 and E2 of a welding system clamp down on the tab 20 and the floor 17 with a calibrated clamping force (arrow $F_C$). While the electrodes E1 and E2 are depicted as rectangular for illustrative simplicity, other electrode shapes may be envisioned, e.g., rounded or with a complex surface. A projection welded joint is formed by conducting an electrical current (arrow $I_C$) through the stack up of the senseline tab 20 and floor 17, with the conducted current (arrow $I_C$) ultimately heating and melting the tab 20 and floor 17. The cooled metals are thus joined together into a welded joint or weld spot in lieu of approaches such as riveted joints. Due to the calibrated variation in the heights H1 and H2 of the surface projections 30, the bus bar 16 penetrates at least partially into a thickness (D) of the cell sense flex circuit 18 at the location of the tab 20, as best shown in FIG. 2B. As noted above, "at least partially" is at least as far as the senseline 64 contained inside of the tab 20.

Figure 2C:
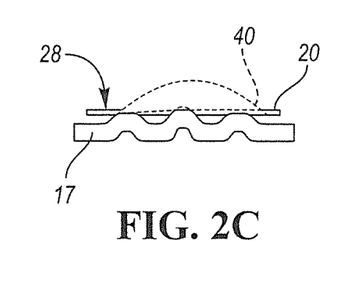

Optionally, the projection resistance welding process may proceed to FIG. 2C where a spot or layer of a suitable adhesive material 40, such as acrylic, polycarbonate, polyethylene, or other thermoplastic, is applied or deposited adjacent to the senseline tab 20. In this instance, the adhesive material 40 is applied to the welded joint or spot weld on a surface 28 of the tab 20 opposite the bus bar 16, i.e., atop the tab 20 with respect to a typical upright orientation of the battery module 10 (see FIG. 1). Spray adhesives or hot melt-type adhesives are two possible example applications of the adhesive material 40.

Projections 30 of height H1 may penetrate deeper into the thickness (D) of the tab 20 of flex circuit 18, and in some instances may fully penetrate the flex circuit 18 as illustrated in FIG. 2C. This situation is indicative of an "overwelded" condition, with the surface projections 30 of a shorter height H2 still ideally making good electrical contact with a corresponding one of the senselines 64 and forming a nominally "good" weld. At overwelded spots, where the taller of the surface projections 30 fully penetrate the tab 20, the use of the optional adhesive material 40 may be applied to exposed surfaces of the projections 30 adjacent surface 28 to help to secure the flex circuit 18 to the bus bar 16. The adhesive material 40 also increases joint strength while also providing dampening of ultrasonic energy imparted during subsequent welding of the electrode extensions 11 of the battery cells 12 of FIG. 1 to the side walls 19. As an additional benefit, the adhesive material 40 may help impede or reduce corrosion of exposed portion of the surface projections 30 adjacent the surface 28.

Figure 3C:
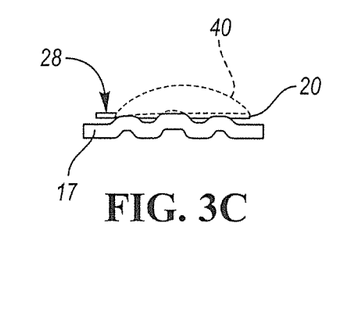

FIGS. 3A, 3B, and 3C depict an embodiment that is similar to the embodiment of FIGS. 2A-C, but with the variable geometry of the surface projections 30 taking the form of a variable width. That is, in FIG. 3A the variation is in widths W1 and W2 of the surface projections 30, with the bus bar 16 projecting partially into the depth or thickness (D) of the cell sense flex circuit 18 at the location of the senseline tab 20 as with FIGS. 2B and 2C. Also as with FIGS. 2B and 2C, the optional adhesive material 40 of FIG. 3C may be deposited onto the surface 28 of the welded joint atop the tab 20 of the flex circuit 18 to provide added corrosion resistance, reinforce the welded joint, and dampen subsequent vibration energy when the battery module 10 of FIG. 1 is eventually welded together, which may be advantageous when the surface projection 30 fully penetrates the tab 20 and is exposed at surface 28.

Figure 4A:
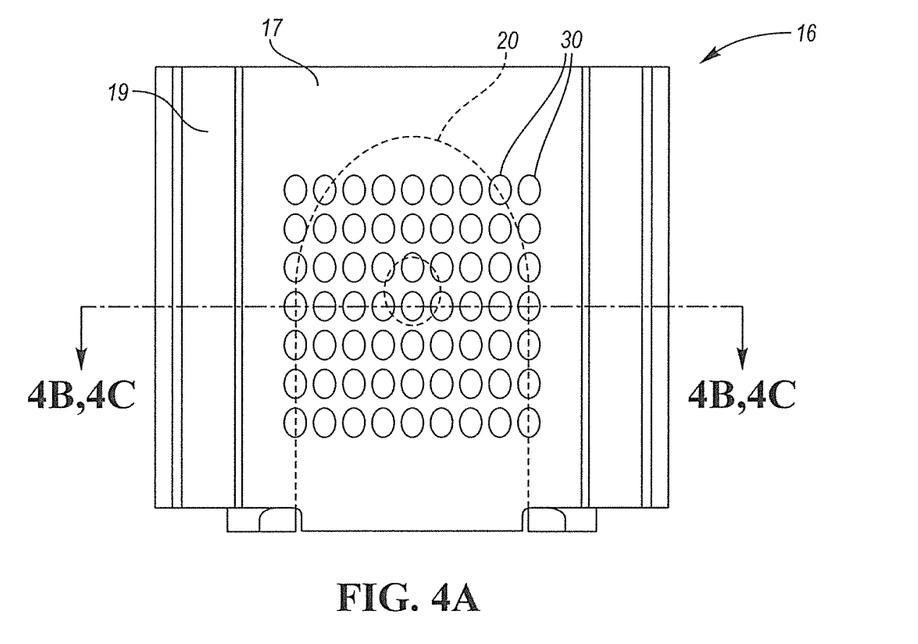
FIG. 4A-C are schematic side view illustrations depicting a process of joining the bus bar and senseline tab using an example projection resistance welding process, with the bus bar having an optional coined/dimpled surface, the tab defining a center opening, and an adhesive material covering the center opening.
Figure 4B:
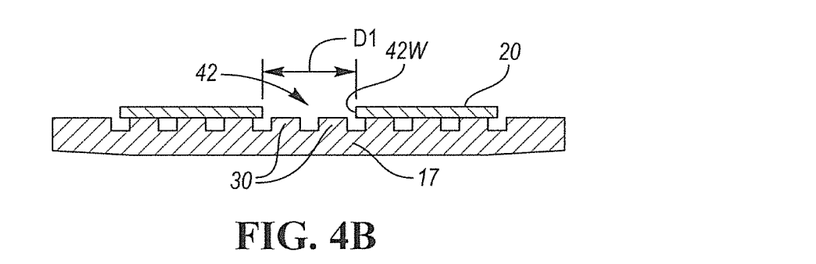
Figure 4C:
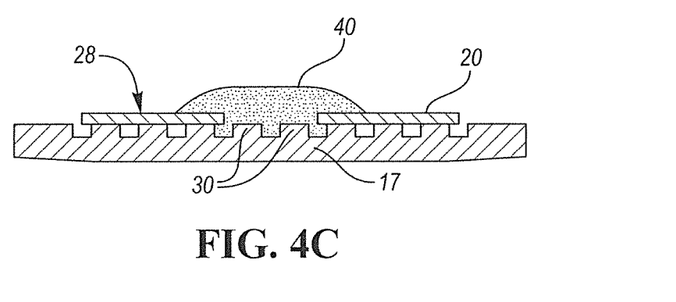

Geometric variation may be achieved in various other ways. For example, FIGS. 4A-C depict an embodiment in which the floor 17 of the bus bar 16 is coined or provided with a dimple pattern having the surface projections 30. Shown as the same height for illustrative simplicity, the surface projections 30 may, as with other embodiments, have different heights and/or widths. This particular embodiment is intended to limit the contact area between the senseline tabs 20 and the floor 17. FIG. 4B is taken along cut line 4B of FIG. 4A, and depicts a cross-sectional side view illustration of the floor 17 and tabs 20. The cell sense flex circuit 18 may include a circular wall 42W defining a center hole 42 of a diameter D1. FIG. 4C, which is taken along cut line 4C of FIG. 4A, depicts some of the surface projections 30 projecting toward the hole 42 and thus exposed therein.

Therefore, an optional layer of the adhesive material 40 may be applied to cover the hole 42 and exposed portions of the bus bar 16 adjacent to the hole 42 below the tab 20. The use of the coined surface and a sufficiently-sized hole 42 in the material of the flex circuit 18 may enable a larger interfacial area with the adhesive material 40 with the attendant reinforcement, dampening, and corrosion protection benefits noted above.

Figure 5A:
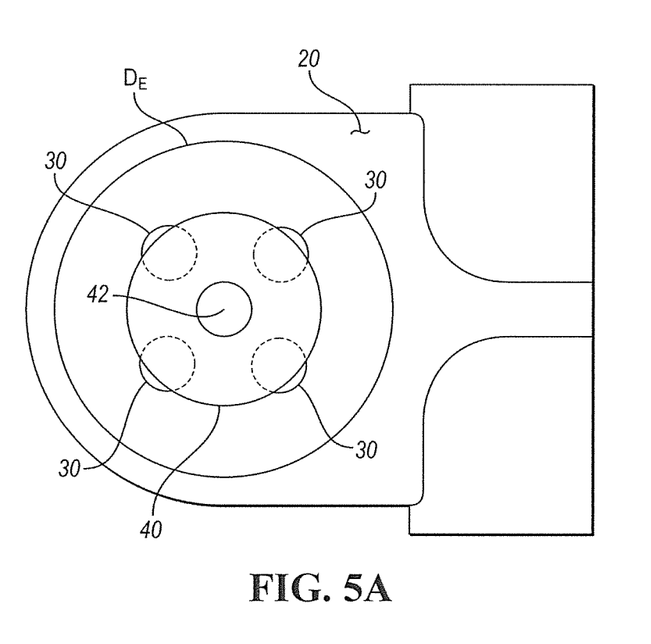
FIGS. 5A and 5B are schematic plan view illustrations depicting the tab with optional cutouts of various geometries.
Figure 5B:
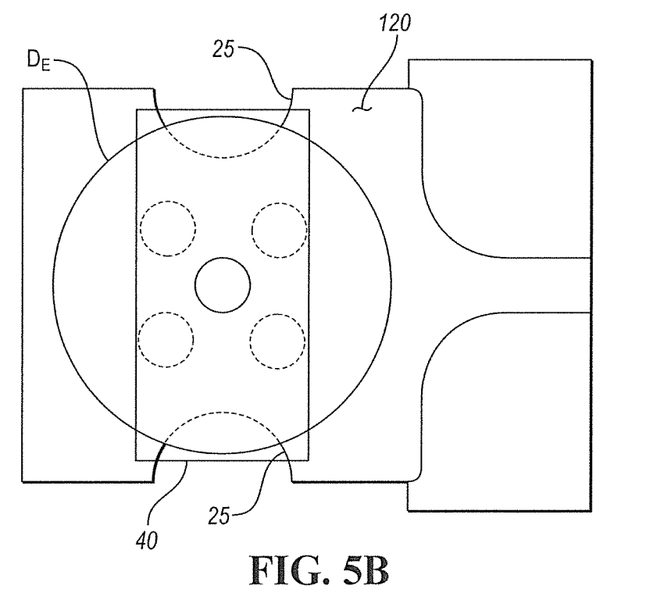

FIGS. 5A and 5B depict an alternative embodiment to that shown in FIGS. 4A-C. An outer diameter ($D_E$) of the electrodes E1 and E2 of FIGS. 2A and 3A is shown as a spatial reference. In this embodiment, cutouts of various geometries may be made in the tabs 20 of the flex circuit 18 of FIG. 1 in order to facilitate adherence of the tabs 20 to the bus bar 16. FIG. 5A is similar to that of FIGS. 4A-C in that the center hole 42 is formed in the tab 20. In this instance, the surface projections 30 penetrate into the material of the flex circuit 18 a calibrated distance away from a perimeter of the center hole 42. The adhesive material 40 may be applied atop the flex circuit 18 to cover most, e.g., at least 75 percent of, the area of the surface projections 30.

In the alternative configuration of FIG. 5B, the cell sense flex circuit 18 defines a pair of side notches 25 in a rectangular tab 120. The layer of adhesive material 40 is applied to cover the pair of side notches 25 and the surface projections 30. Thus, the adhesive material 40 will adhere to the bus bar 16 at three locations: the center hole 42 and each of the two side notches 25.

Figure 6A:
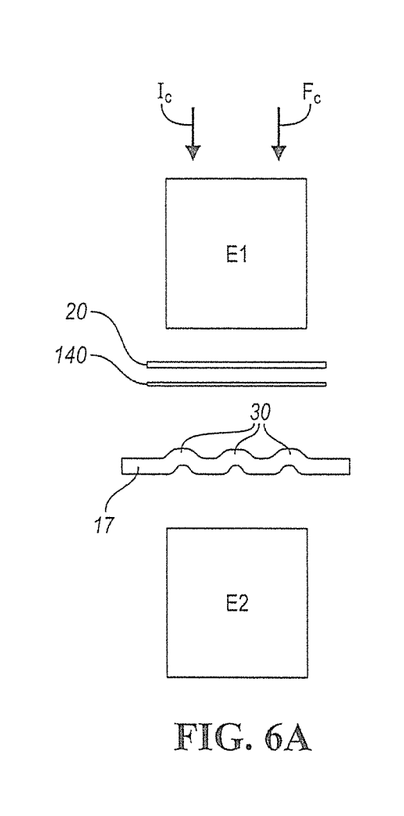
FIGS. 6A-C are schematic side view illustrations depicting a process of joining the bus bar and the tab, with the bus bar having a variable surface geometry and adhesive material between the bus bar and the flex circuit.
Figure 6B:
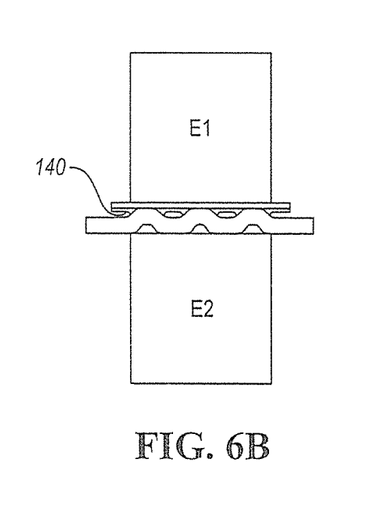
Figure 6C:
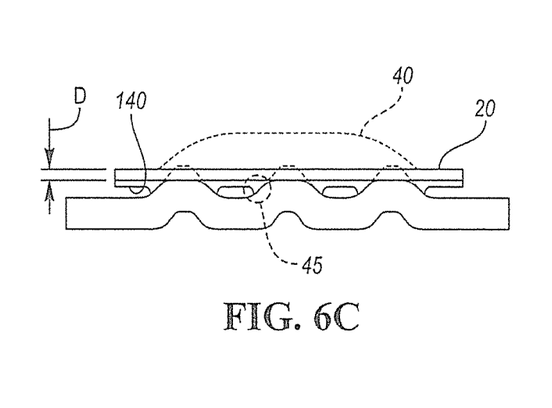

FIGS. 6A-C depict an embodiment of the disclosed method in which a layer of adhesive material 140 is applied in FIG. 6A between the cell sense flex circuit 18 and the bus bar 16 rather than atop the flex circuit 18 as in the earlier described embodiments. Pre-application of the adhesive materials 140 at this location is intended to result in fusion weldment at the electrode center area after resistance welding. That is, the clamping force ($F_C$) shown in FIG. 6A will tend to squeeze out some of the adhesive material 140 prior to resistance welding, thereby coating the surface projections 30 and the underside of the tab 20 as indicated by distribution zone 45 in FIG. 6C. Ultimately, at FIG. 6C the cured adhesive material 140 surrounds the weld area and provides the benefits noted above.

An optional layer of adhesive material 40 may be applied atop the senseline tab 20 of the flex circuit 18 as in the earlier embodiments. That is, applying adhesive material 40 may include applying a first layer of adhesive material 140 positioned between the cell sense flex circuit 18 and each of the bus bars 16 and applying a second layer of adhesive material 40 on a side 28 of the flex circuit 18 that is opposite the bus bars 16, as best shown in FIG. 6C.

The embodiment of FIGS. 6A-C may use different types of adhesive material 140 than that of the adhesive material 40 applied atop the senseline tab 20. For instance, as the adhesive material 140 of FIGS. 6A-C effectively forms a weld bond at the indicated location, suitable materials for adhesive material 140 may include the use of glass beads or other materials to closely control the thickness of the adhesive material 140.

Figure 7:
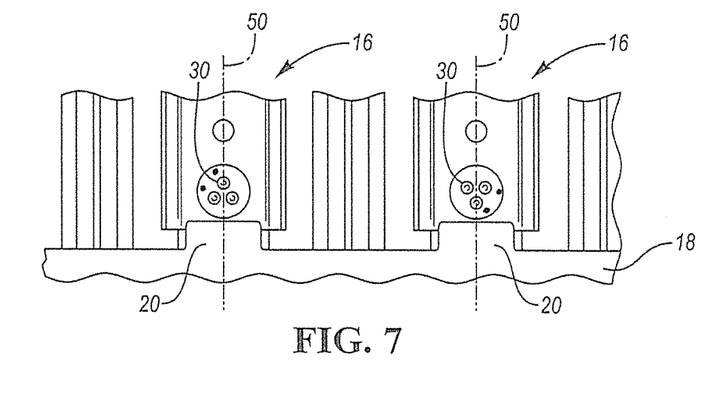
FIG. 7 is a schematic plan view illustration of alternating orientations of projections with respect to adjacent parallel bus bars.

FIG. 7 depicts a possible embodiment in which alternating projection patterns are employed to achieve more even wear of the electrodes E1 and E2 of FIGS. 2A, 3A, 6A, and 6B. The bus bars 16 may be arranged in multiple parallel rows, which is also depicted in FIG. 1, such that an adjacent pair of the bus bars 16 of a given row has parallel longitudinal axes 50. The patterns of distribution or orientations of the individual surface projections 30 of the adjacent bus bars 16 may be different between the adjacent pair. For instance, the pattern of distribution may be rotated 180 degrees with respect to a longitudinal axis 50 of the bus bars 16. While three surface projections 30 are shown, it may be possible to use as few as two of the surface projections 30 in certain embodiments or applications, or more than three surface projections 30. In an alternative embodiment, projections 30 having longer relative lengths may vary between adjacent bus bars 16. For example, the projections 30 indicated by black circles in FIG. 7 may be longer than other projections 30. Such a configuration may be used whether or not the surface projections 30 of adjacent bus bars 16 have the same or different patterns.

Using the approaches set forth above, resistance projection welding may be used as a joining process to enhance the robustness of the battery module 10. The use of such projection welding may produce welded joints that can better sustain the forces of ultrasonic welding and field vibration, e.g., road vibration when the battery module 10 is used as part of a vehicle powertrain. The use of adhesives may further optimize construction via improved dampening, reinforcement, and corrosion protection.

While the best modes for carrying out the disclosure have been described in detail, those familiar with the art to which this disclosure relates will recognize various alternative designs and embodiments lying within the scope of the appended claims. It is intended that subject matter contained in the above description and/or shown in the accompanying drawings shall be interpreted as illustrative and not limiting.

What is claimed is:

1. A battery module comprising:
   an outer cage;
   a pair of end plates;
   a plurality of pouch-style battery cells, wherein each of the battery cells has a respective pair of tabular electrode extensions, and wherein the battery cells are arranged adjacent to each other within the outer cage and secured via the pair of end plates;
   a plurality of bus bars configured to electrically connect the battery cells via the electrode extensions, each of the bus bars having a respective floor with at least one surface projection and side walls that are orthogonally arranged with respect to the respective floor, wherein for each respective one of the bus bars, a corresponding one of the electrode extensions of an adjacent pair of the battery cells is welded to an opposing one of the side walls; and
   a flat cell sense flex circuit having a conductive senseline positioned between a pair of substrates, and including a plurality of flat senseline tabs extending radially from a perimeter of the flex circuit and containing the senseline, wherein each of the senseline tabs is positioned in direct physical and electrical contact with the floor of a respective one of the bus bars, and wherein the cell sense flex circuit is configured to determine a corresponding cell voltage of each of the battery cells using the senseline tabs;
   wherein each of the senseline tabs is projection resistance-welded to the floor of the respective one of the bus bars, such that the at least one surface projection of the floor penetrates into the senseline tab at least as far as the senseline contained within the senseline tab.

2. The battery module of claim 1, wherein the at least one surface projection of each of the bus bars includes a surface projection that fully penetrates the senseline tab, the battery module further comprising: an adhesive material coating an exposed portion of the at least one surface projection that fully penetrates the senseline tab.

3. The battery module of claim 2, wherein the at least one surface projection includes a plurality of surface projections of different relative heights or widths.

4. The battery module of claim 1, wherein the each of the bus bars forms a U-shaped channel, and wherein the at least one surface projection extends orthogonally from the respective floor.

5. The battery module of claim 1, wherein each of the senseline tabs defines a respective center hole, the battery module further comprising: adhesive material covering the respective center hole and an exposed portion of the bus bar adjacent to the respective center hole.

6. The battery module of claim 5, wherein the each of senseline tabs further defines a respective pair of side notches, and wherein the adhesive material at least partially covers the respective pair of side notches.

7. The battery module of claim 1, wherein the floor of the bus bar defines a coined or dimpled surface defining the at least one surface projection.

8. The battery module of claim 1, further comprising: adhesive material positioned between each of the senseline tabs and the respective bus bar.

9. The battery module of claim 1, further comprising: adhesive material positioned on a side of each of the senseline tabs that is opposite the respective bus bar.

10. The battery module of claim 1, wherein a pattern of distribution of the plurality of surface projections is different between the adjacent pair.

11. The battery module of claim 10, wherein an identity of a longest projection of the plurality of surface projections is different between the adjacent pair.

12. A method of manufacturing a battery module having a plurality of battery cells arranged adjacent to each other within an outer cage and secured via a pair of end plates, each respective one of the battery cells having a pair of tabular electrode extensions, the battery module further having adjacent U-shaped bus bars each having a floor flanked by side walls that are orthogonally arranged with respect to the floor, and a flat cell sense flex circuit arranged around a perimeter of the flex circuit and configured to determine a corresponding cell voltage of each of the battery cells, wherein the cell sense flex circuit includes a conductive senseline positioned between a pair of substrates and the flat senseline tabs contain a portion of the senseline, the method comprising:
   forming, on the floor of each of the bus bars, a set of surface projections of different heights or widths;
   positioning each of the flat senseline tabs adjacent to the surface projections and the floor of a respective one of the bus bars;
   welding the electrode extensions of each of the battery cells to a respective one of the side walls of a respective one of the bus bars such that the battery cells are electrically connected to each other; and
   joining each of the senseline tabs to the floor of a respective one of the bus bars using a projection resistance welding process such that the surface projections of the respective bus bar penetrate into a respective one of the flat senseline tabs at least as far as the senseline.

13. The method of claim 12, wherein forming a set of surface projections of different heights or widths includes forming at least one of the surface projections with a height that is 5 to 10 micron greater than a height of remaining surface projections in the set of surface projections, the method further comprising:
   joining each of the senseline tabs to a respective one the bus bars using the projection resistance welding process such that the surface projections with the height that is 5 to 10 micron greater penetrate fully through the senseline tab; and
   applying an adhesive material adjacent to an exposed portion of the surface projection that penetrates fully through the senseline tab.

14. The method of claim 13, wherein applying an adhesive material includes applying a hot-melt adhesive material.

15. The method of claim 13, wherein applying an adhesive material includes applying spray adhesive material.

16. The method of claim 13, wherein applying an adhesive material includes applying a first layer of the adhesive material between each of the senseline tabs and the respective bus bar and applying a second layer of the adhesive material on a side of the senseline tab that is opposite the respective bus bar.

17. The method of claim 16, wherein applying a second layer of the adhesive material includes applying a layer of adhesive material containing glass beads.

18. The method of claim 13, wherein each of the senseline tabs defines a respective center hole, the method further comprising: applying an adhesive material that covers the respective center hole and an exposed portion of the bus bar adjacent to the respective center hole.

19. The method of claim 13, wherein each of the senseline tabs further defines a respective pair of side notches, and wherein applying an adhesive material includes at least partially covering the respective pair of side notches with the adhesive material.

20. The method of claim 13, the method further comprising: rotating a pattern of distribution of the surface projections 180 degrees between adjacent pairs of the bus bars.

* * * * *